United States Patent

Ayer et al.

[11] Patent Number: 5,251,378
[45] Date of Patent: Oct. 12, 1993

[54] CUTTING IMPLEMENT

[75] Inventors: Lloyd Ayer, Bethany; Thomas Zamecnik, Clinton, both of Conn.; Attila Bodnar, Cliffside Park, N.Y.

[73] Assignee: P.A.J. America, Ltd., White Plains, N.Y.

[21] Appl. No.: 828,133

[22] Filed: Jan. 30, 1992

[51] Int. Cl.⁵ .................. B26B 19/14; B26B 3/00; B26B 9/00
[52] U.S. Cl. ............................... 30/205; 30/132; 30/347
[58] Field of Search ............... 30/205, 229, 239, 240, 30/241, 244, 235, 253, 254, 347, 205, 132; 338/132

[56] References Cited

U.S. PATENT DOCUMENTS

| | | | |
|---|---|---|---|
| 255,102 | 3/1882 | Danheim | 30/347 |
| 316,937 | 5/1885 | Bell | 30/205 |
| 445,700 | 2/1891 | Lachaume et al. | 30/347 |
| 847,491 | 3/1907 | Morgan | 30/347 |
| 1,414,239 | 4/1922 | Warren | 30/205 |
| 1,422,901 | 7/1922 | Terry | 30/347 |
| 3,676,822 | 7/1972 | Slagg et al. | 338/132 |
| 4,086,700 | 5/1978 | Inada | 30/347 |

Primary Examiner—Douglas D. Watts
Assistant Examiner—Paul M. Heyrana
Attorney, Agent, or Firm—Kenneth J. Stempler

[57] ABSTRACT

A cutting implement employing a pair of rollers placed vertically one above the other, the rollers having sharpened edges that slightly overlap and touch each other at a selected position, forming a cutting point where they touch. When the rollers are rotated, the sharpened edges form a continuous cutting edge for cutting material such as most paper and plastics. The rollers are provided with a degree of toe-in in the direction of rotation to insure that they remain in contact with each other during the cutting process. The rollers are rotatably mounted to a stiff carrier to provide dimensionally predictable location of the rollers with respect to each other, and to insure the smooth flow of material through the rollers as the material is being cut.

21 Claims, 7 Drawing Sheets

CUTTING IMPLEMENT

BACKGROUND OF THE INVENTION

Cutting implements have been used for many years. Most cut by shearing action. Scissors are typical. To cut using scissors, the blades are positioned on opposite sides of the material, and the blades are then pressed together with enough force to drive the blades through the material to be cut. The material is cut or, more accurately, separated, by the shearing action of the blades as they move through the material.

Scissors have several drawbacks, one of which is that they are not safe. The exposed blades of a scissors can cut the user and, if dropped, the generally pointed edges can cause puncture wounds. They can be difficult to pick up as the handles, to which the blades are connected, are free to rotate about a central pivot. Additionally, the length of a cut that can be obtained using conventional scissors is limited to the length of the blade which is employed. Cuts that are longer than the length of the scissors blades are frequently ragged, as the stop and start point for each cut is generally clearly visible.

For people who use scissors frequently, carpel tunnel syndrome may become a problem. Carpel tunnel syndrome is an inflammatory condition that may be caused by overuse of the muscles or connective cartilage of the wrist, a condition that accompanies the frequent use of scissors.

A razor blade is another type of cutting device frequently used for some types of cutting. The danger inherent in using a razor blade or an equivalent sharp edged instrument, such as a knife, is well known. While they provide the ability to cut continuously, they dull quickly, will often rip and ruin the material as the blade dulls, and are quite capable of maiming or destroying fingers, hands and other parts of the human anatomy. If the material to be cut is placed on a substrate, or is a cardboard shipping container, the razor blade or knife will also tend to cut the substrate or the product contained in the cardboard container.

Another type of cutting device has been employed which contains a pair of ball bearings mounted in tandem, with the axis of each ball bearing offset vertically from the other. This device is described in Hungarian Patent No. 179232. In addition, a cutting implement that employs a pair of ball bearings has been commercially available on the market in the United States.

In connection with the aforesaid commercially available twin ball bearing cutting implement, one of the ball bearings is mounted on a plastic non-rotatable shaft that is in turn located on the main body of the device, which is also made of plastic. The second ball bearing is mounted on a separate plastic carrier containing a second non-rotatable shaft made of plastic, and the carrier is connected to the main body by means of glue and a single small screw. The carrier is also provided with one or more locating dowels which are received in receiving holes provided in the main body of the device. Glue is employed to retain the dowels in the receiving holes. The plastic employed in this device is of the nylon family, which we have found tends to absorb moisture and swell. If moisture is absorbed by the plastic, it tends to change the dimensional relationship between the ball bearings when the ambient humidity is high, thus tending to destroy the cutting ability of the device.

Cutting forces that act on the opposed bearings resolve into opposed radial forces that tend to cause the ball bearings to separate in the radial direction, and opposed axial forces, which tend to cause the ball bearings to separate in the axial direction. Applied forces generated in ordinary cutting activities are frequently sufficient to cause the glue connection between the plastic carrier and the plastic main body to shift or to completely separate, thus causing the ball bearings to lose contact with each other. The frequent result is a permanent realignment of the relationship between the ball bearings. When this occurs, the device will no longer be able to cut. We have observed that the carrier will permanently shift, with consequent permanent realignment of the ball bearings, with loads applied by attempting to cut several sheets of copy or bond paper at one time, or by attempting to cut any relatively thick sheet of material, such as thin cardboard, poster board and the like. One result is that the prior art device is limited to thin materials, generally less than 0.4 mm in thickness (stated on its packaging), and will not absorb much force and still retain its ability to cut.

In addition to the foregoing, the prior art device would frequently not work to cut material after it had been assembled, regardless of the level of the force applied to the ball bearings. To make these useful, adjustments were required, which generally took the form of adjusting the screw used to mount the ball bearings to their respective shafts to either move the ball bearings closer to each other, or farther apart to reduce the force of contact between the two ball bearings. However, any misalignment of the bearings that occurred during cutting would render the unit unusable.

Still further, the prior art construction frequently failed to establish a contact point at the point of entry of the material to be cut. If a contact point was accidentally established, it was frequently established at the wrong location. The knowledge required to repeatedly make useful devices was not displayed by the prior art devices. Making these prior art devices useful was a matter of luck and experiment rather than design. The reject rate, even after such experimentation, remained substantial.

BRIEF DESCRIPTION OF THE INVENTION

In accordance with the present invention, a pair of rotatable rollers are provided. Each roller is cylindrical in shape and is provided with at least one face that is ground to form a sharp edge with the radial surface of the roller. If desired, the roller face or faces may be ground to provide a slightly concave surface. Doing so will further the ability of the rollers to shear material, as will be described further below. However, it is not essential that the faces of the rollers be ground to provide a concave surface.

Means are provided for mounting the rollers such that the ground faces of the rollers are opposed to and touch each other. The axes of the rollers are offset with respect to each other to an extent sufficient to create a small amount of overlap between them. Means are provided to insure that the overlap will not entirely disappear when the rollers are subjected to cutting forces, as is the case with the prior art device in many instances.

The amount of overlap that should be employed is determined by a number of factors. One such factor is the stress placed on the rollers during cutting. The mounting means that the rollers are mounted on must be sufficiently stiff to prevent separation of the rollers. The rollers must remain in contact with each other both radially (some overlap must be retained during cutting) and axially as well. If the forces generated are sufficient to cause the rollers to separate, which was generally the case with the prior art device, the ability of the rollers to continue to cut will decrease or disappear, and the cutting implement to which the rollers are mounted will generally cease to function, a condition inherent in the design of the prior art device.

In accordance with the present invention, means are provided for mounting the rotatable rollers in a manner which places the axes of the rollers on an angle with each other such that the circumferential edges of the rollers touch each other at one point, herein called the cutting point. The amount of the included angle, or toe-in, is the sum of the angles made by each roller relative to a selected plane, herein called the cutting plane. The preferred amount of toe-in is about five degrees or less, and for best results with most materials, the toe-in angle should be between one and two degrees. The prior art device does not appear to have provided for the angling of the rollers to form a contact point.

The cutting point is the point at which the material to be cut first makes contact with the rollers. The cutting angle, defined by the lines emanating from the cutting point (the apex) and tangent to the circumference of each roller, should be as small as possible, particularly when the material to be cut is used to rotate the rollers. In this instance, for best results, the cutting angle should be generally less than fifteen degrees. Cutting forces tend to increase as the cutting angle increases, especially when cutting thick materials with substantial shear strength. To prevent separation of the rollers when cutting such thicker materials, a smaller cutting angle is beneficial. For instance, if applied cutting forces cause the rollers to separate in the axial direction, the ability of the rollers to continue to cut may well be lost. Instead, the rollers may then rip the material to be cut, a condition that frequently occurred with the prior art device. When ball bearings are employed as the rollers, axial movement between the inner and outer races becomes a particularly harsh problem. The prior art device was unable to cope successfully with axial movement between the inner and outer races of the bearings that it employed. It is less important to control the cutting angle when the rollers are powered, although the degree of power that is required to cut increases with larger cutting angles.

When using ball bearings, the balls generally permit some movement between the inner and outer races to occur. The face of the outer race is the face that co-acts with that of the other roller bearing in forming the overlap that is required, and in forming the cutting point, as discussed above. In accordance with the present invention, means are provided to insure that axial contact between the outer races of the bearings is not lost when cutting forces are applied, which was not provided by the prior art device.

As indicated above, the faces of the outer races of the ball bearings are ground to provide a sharp edge at the junction of the face of the ball bearing outer race and its circumferential edge. If the face of the ball bearing is ground flat instead of concave, accumulated tolerances in the bearings may cause the outer races to touch at an angle formed by the plane of the faces of the outer races of the bearings. The angle thus formed is herein described as camber. The existence of a camber is essentially an uncontrolled quantity with the prior art device. The degree of camber will vary from device to device, depending as it does on the level of tolerance build up, which of necessity varies from device to device. The existence of camber, which may be negative or positive, tends to change the relationship between the rollers in an uncontrolled manner with the prior art device. And in addition, the existence of camber can cause the rollers to contact each other with sufficient force to prevent the device from operating as a cutting tool, a condition that often occurred with the prior art device. In accordance with the present invention, means are provided for counteracting the negative effects of camber when the rollers employed are ball bearings.

The cutting implement of the present invention can be employed to shear cut materials of varying thicknesses and shear strengths. It is not necessary to vary the minimum degree of overlap between the rollers to accommodate very thick materials. If thicker materials need such accommodation, it is best achieved by using larger radius rollers, and to further stiffen the unit to which the rollers are mounted. The cutting angle, as described above, can remain reasonably small to keep the force required to rotate the rollers to a minimum.

The forces that the rollers are subjected to during cutting is a function of the thickness of the material to be shear cut, and its shear strength. For instance, a thin sheet of tissue type paper does not have much shear strength. Yet an equal thickness of aluminum foil, or metal, would have much greater shear strength. Also, thin materials, such as tissue paper, thin plastics, or newsprint, do not have a significant degree of lateral stiffness along the plane of the material, while bond paper, or copy paper, has substantially greater strength in this direction. The differences in shear strength and lateral stiffness of various types of material that the user may want to cut using the rollers of the instant invention are of some importance.

In accordance with one aspect of the instant invention, the rollers are mounted on a carrier having a pair of mounting shafts on which the rollers are rotatably mounted. Handle means are provided to which the carrier is rigidly connected, preferably by forming the carrier and the handle means as a single unit to increase the strength of the assembly. The rotatable rollers are mounted such that they contact each other at the cutting point through an appropriate amount of toe-in. Camber is eliminated or accounted for. The handle means is provided with means to permit the user to grip the handle.

The cutting implement described immediately above is a hand held cutting implement. To shear cut material such as copy paper or bond with the implement requires the user to hold the implement in one hand, and the material to be shear cut in the other. The material is moved to the cutting point at the juncture of the two rotatable rollers, and the material is either pulled through the rotatable rollers, thus rotating the rollers as the material moves through them and shear cutting the material as the sharp edges of the rollers roll along the material, or the handle is pushed forward to achieve the same result.

In a hand held cutting implement, the stiffness of the material to be cut must be sufficient to counteract the lateral forces that are generated by the rollers in the material. It is to be understood that rotating the rollers requires that the friction force created between the rotating and stationery sections of each roller be exceeded in order to rotate the rollers. And in addition, the pre-load forces which create friction between the touching faces of the rollers in the area of overlap must also be overcome. Accordingly, in a hand held instrument, with no other forces applied, the lateral stiffness of the material to be cut must be sufficiently great so as to overcome the friction forces set forth above. Materials with little lateral stiffness, such as tissue type paper and very thin plastics, such as the wraps that are available in most supermarkets, do not generally exhibit sufficient lateral stiffness to overcome the friction forces involved. Other types of material, such as copy paper, bond paper, thick plastics, etc. generally have sufficient lateral stiffness. Also, fabrics of the type which employ woven materials in a loose structure will often not exhibit sufficient lateral stiffness to rotate the rollers, as each strand of fiber will tend to be pushed forward as force is applied.

To reduce the friction inherent in employing rollers, one may substitute ball or other types of bearings. Ball bearings generally have a low level of internal friction, and the friction that they exhibit may be further reduced by the use of lubricants. Of course, the same lubricants, such as silicon based lubricants, can be employed to reduce rolling friction regardless of the type of roller that is employed. To overcome the friction at the contact point, which may be greater that the friction inherent in the rollers that are employed, it is best not to use a liquid lubricant, as some of the lubricant would generally be transferred to the material to be cut. However, a thin, lubrile coating may be employed, if desired, such as teflon, which coats, provides lubricity, is hard, and will not generally transfer to the material to be shear cut.

Friction forces can be substantially reduced, if not entirely eliminated from the cutting implement, by providing rotational power to one or preferably both of the rollers. Power can be provided by a conventional electric motor, along with means for rotatably connecting the output of the motor to the rollers or, in the case of ball or similar type bearings, to the rotatable outer races. Of course, other means for providing power to the rollers to overcome friction forces can also be employed, and these would be known to a person of ordinary skill in the art. Power can be provided by connection to a conventional AC line, or through the use of batteries, preferably rechargeable, such as Nickel Cadmium and similar batteries that provide a sufficient amount of output power.

The speed at which shear cutting occurs when using a power driven cutting implement will be generally determined by the speed at which the rollers are driven. For best results, the powered cutting implement can be provided with means for varying the speed at which the rollers are rotated, such as through the use of a conventional rheostat or other conventional means well known to those of ordinary skill in the art.

Particularly in connection with a hand held cutting implement, the path the material takes after it passes through the rotatable rollers can assist in shear cutting. In accordance with another aspect of the instant invention, means are provided to separate the parts of the shear cut material after it has passed through the rotatable rollers. This may take the form, in a hand held cutting implement, of one or more guides or channels which serve to direct the cut material in the desired manner. For instance, a pair of guide means can be provided on each side of the handle, one of which directs the cut material upwardly, and the other of which directs the other side of the cut material in a downward direction. Separating the cut material in this manner provides two beneficial effects. One effect is to provide assistance to the rotatable rollers in shear cutting the material, as the vertical separation of the material in effect provides a small degree of force at the cutting point to assist the rotatable rollers in shear cutting the material. The second effect is to provide a degree of safety to the user by directing the cut material away from exposed fingers, thus reducing if not eliminating the possibility of painful paper cuts. In addition, when shear cutting thin materials having a minimum amount of lateral stiffness, the edge of the material which is directed downwardly may curl, and better results are obtained by providing passage means in the handle to accommodate this tendency to curl. Doing so tends to reduce the tendency of the cut material to "hang up" before it can exit the device.

BRIEF DESCRIPTION OF THE DRAWINGS

Turning now to the drawings, in which like numerals refer to like parts.

BRIEF DESCRIPTION OF THE PREFERRED EMBODIMENTS

Figure 1:
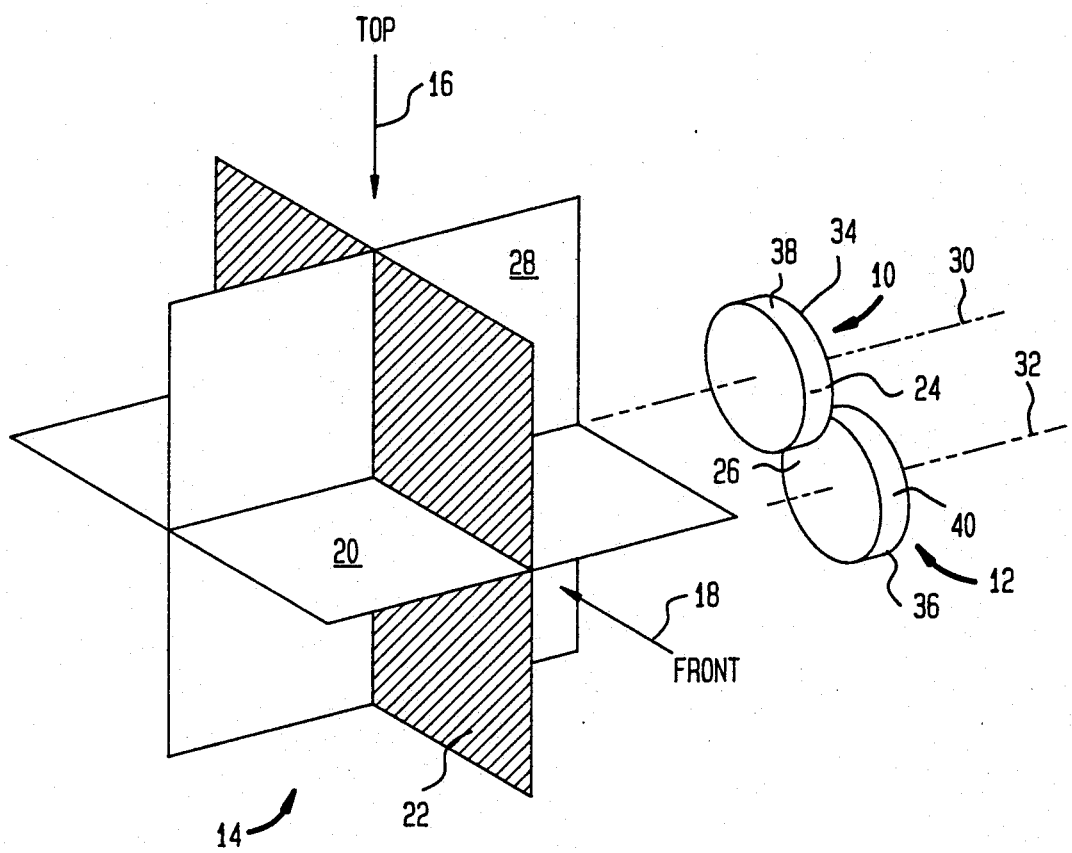
FIG. 1 is a descriptive isometric view in which a set of planes is shown for the purpose of providing the ability to relate information about the preferred geometrical relationships of the rollers to each other and to the structures to which the rollers may be mounted

Referring now to FIG. 1, the rollers of the instant invention are designated by the numerals 10 and 12. Roller 10 is shown as the top, or upper, roller, while roller 12 is shown as the bottom, or lower, roller. It is to be understood that the relationship between rollers 10 and 12 can be reversed, as desired, so that the upper roller is positioned on the opposite side of the lower roller.

The isometric rendition of planes designated in FIG. 1 by the numeral 14 is intended to help understand the preferred geometrical relationship between the rollers 10 and 12, and will be referred to in connection with the description of geometrical relationships throughout this specification and the claims. The top of the system of planes, designated by the numeral 16, is intended to differentiate between the top and bottom of the rollers. The front, designated by the numeral 18, is intended to indicate the direction that the material to be cut takes when it first enters the rollers. The numeral 20 designates the cutting plane in which shear cutting of the material occurs. The cutting plane designates the orientation of the material to be cut as it enters the rollers. The numeral 22 designates the longitudinal plane, which is the plane that rises between the two rollers and which would be parallel to the opposed faces 24 and 26 of the rollers if the opposed faces of the rollers were precisely parallel to each other. Numeral 28 refers to the transverse plane, which is the plane in which the axes 30 and 32 of the rollers are preferably located, one above the other. If the material to be cut is fed to the rollers along the cutting plane 20, then the longitudinal plane 22, at its intersection with the cutting plane, provides the line along which the material will be shear cut.

The opposing faces 24 and 26 of the rollers are ground to provide sharp edges 34 and 36 at the intersection of the opposed faces and the circumference of the rollers 38 and 40, respectively. If desired, both faces of each roller may be ground in this manner, thus permitting roller reversal as wear occurs.

Figure 4:
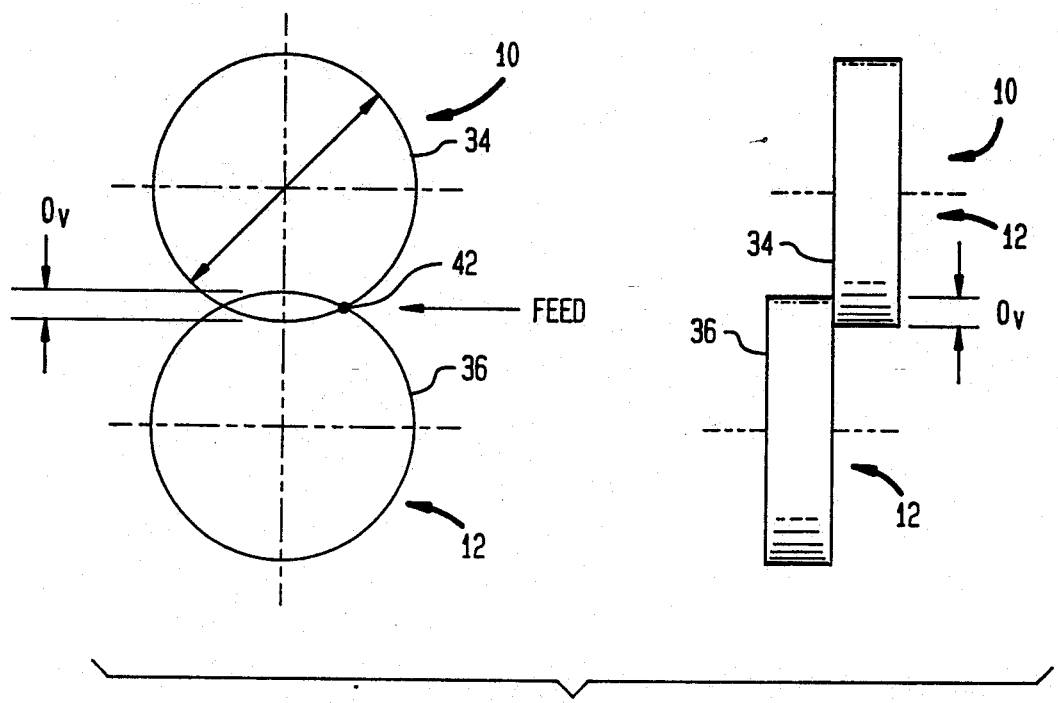
FIG. 4 shows a preferred geometrical relationship for the overlap of the rollers.

Referring now to FIG. 4, the rollers 10 and 12 are shown in which the relationship of the rollers is characterized by a small amount of overlap, designated 0. The overlap is the sum of the radii of the two rollers, minus the distance between their axes. For good shearing action, the rollers must overlap so that the sharp edges 34 and 36, when material is moved between them along the cutting plane, can easily shear through the material. The amount of overlap can be quite small, generally of the order of several hundredths of an inch, but should be large enough for the rollers to retain some overlap when the rollers are subjected to cutting forces from the material to be cut (not shown). If the overlap disappears when cutting forces are applied to the rollers, the rollers will tend to lose their ability to further shear the material. This holds true for many types of material, such as paper, poster board, and others which enjoy some lateral stiffness, but may not hold true for some very soft materials which are gel-like in nature or have very low lateral stiffness, and in which shearing, once begun, will change to a ripping action if the overlap between the bearings disappears.

Figure 2:
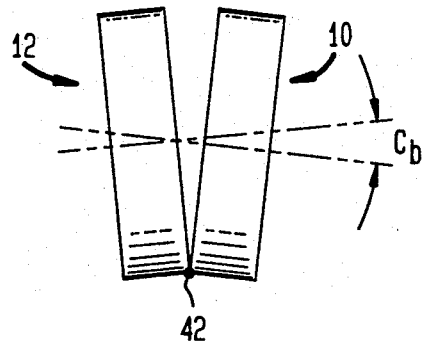
FIG. 2 shows a preferred geometrical relationship between the rollers which is employed to create a contact point for the material to be cut.

For best results, it is preferred that the rollers 10 and 12 have their axes canted towards each other in the cutting plane 20, as viewed from the top 16 in FIG. 1, where the apex of the angle is located at the front 18. The cant angle, or toe-in, is preferably not more than about five degrees, and for best results, should not be more than about two degrees. Good results may be obtained using a smaller amount of toe-in, if desired. However, in each instance, the degree of toe-in used must be sufficient to cause the rollers to touch each other at, or slightly ahead of, the apex, as shown in FIG. 2. The toe-in angle is designated by the notation $C_b$ in FIG. 2. The point at which the rollers touch each other is the contact point (see FIG. 4) and is designated by the numeral 42.

Figure 3:
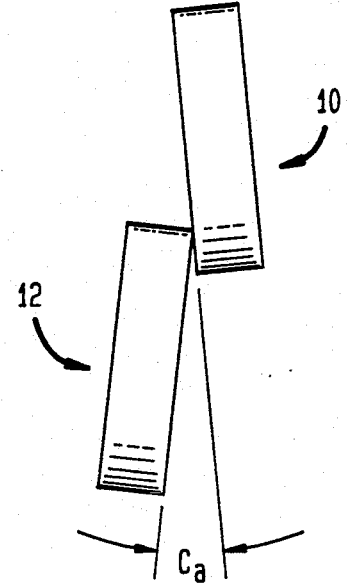
FIG. 3 demonstrates camber which can be created by tolerance build up and shows the planes in which such occurs.

Referring to FIG. 3, the rollers 10 and 12 are shown angled towards each other in the transverse plane (see FIG. 1). The angle between the rollers created in the transverse plane is the camber angle, designated by the notation $C_a$, and is undesirable. The camber angle shown is generally a function of the tolerance build up in the cutting implement and is difficult to entirely eliminate, although its adverse effects can be eliminated, as discussed hereinbelow.

Figure 5:
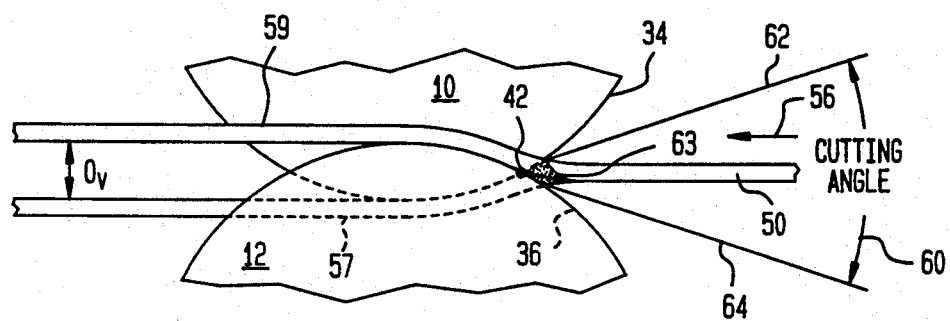
FIG. 5 is a sketch which shows the manner is which material to be shear cut moves to and through the rollers.

Referring now to FIG. 5, a sheet of material 50 is shown being shear cut by the rollers 10 and 12. As the material to be cut moves through the rollers in the direction of the arrow denoted by the numeral 56, the material is compressed slightly and the friction thus generated between the circumferential surface of the rollers and the material 50 causes the rollers 10 and 12 to rotate. The speed of rotation is generally determined by the linear speed of the material as it moves through the rollers if the rollers are not separately powered, or by the angular speed generated by the power source and associated mechanics used to rotate the rollers if a separate power source is employed. The material is sheared by the sharp edges 34 and 36 of the rotating rollers as these sharp edges pass through the material as the material moves past the cutting point. As it is sheared, the portion of the material that is located under the upper roller 10 is forced downwardly as shown by the dotted lines 57 in FIG. 5, and the portion of the material that is located above the lower roller 12 is forced upwardly, as denoted by the numeral 59 in FIG. 5. The degree of separation, as measured in the longitudinal plane 22 (see FIG. 1) of the two portions of shear cut material is approximately equal to the overlap $O_v$ between the upper and lower rollers.

The separation of the two portions of material at the cutting point tends to lift the material in the region 63 just forward of the cutting point, as shown in FIG. 5. A small cutting region is formed in which the shear stress on the material begins to increase before the sharp edges of the rollers 10 and 12 begin to shear through the material. In addition to insuring that the rollers can operate to shear the material, the overlap region also tends to assist the rollers by increasing the shear stress just forward of the cutting point. The cutting angle 60 is determined by the tangents 62 and 64 to the circumferential surfaces of the rollers, with the apex thereof located at the cutting point 42. The cutting angle is, of course, determined by the degree of overlap between the upper and lower rollers, and should, for best results, be kept small. The larger the cutting angle, and by definition, the larger the overlap, the more likely it will be to begin to tear material with low lateral stiffness in the cutting region, before the material reaches the cutting point. Additionally, the larger the cutting angle that is employed, the greater is the degree of force required for the material to travel through the rollers. Depending on the materials that one wishes to shear cut using the cutting implement of the instant invention, experimentation with maximum cutting angles will pinpoint the most appropriate cutting angle to be employed for the purpose. In a hand held cutting implement adapted primarily for cutting relatively thin materials, such as conventional paper of varying thicknesses, copy paper, bond paper, thin plastics and typical cardboard sections used in shipping containers, along with other types of materials of the same or similar type, a cutting angle of approximately fifteen degrees or less provides good results.

Figure 6:
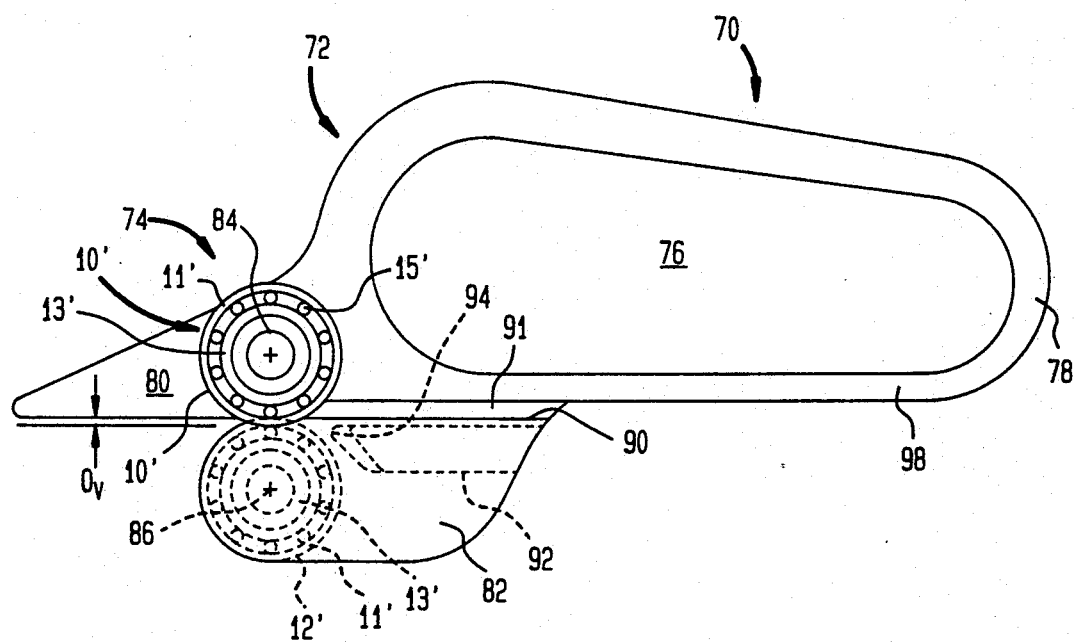
FIG. 6 is a side view of one type of handle that can be employed to rigidly connect the roller assembly to the handle in accordance with the present invention.

Referring now to FIG. 6, a handle 70 is shown which comprises a main body 72 and a roller carrier section 74. The implement shown in FIG. 6 is for use as a hand held cutting implement of the type in which the movement through the rollers of the material to be cut is used to overcome friction and to rotate the rollers to shear cut the material.

The shape of the handle 70 is complex, and provides a central opening 76 which, in combination with the rim 78, forms a grip to accept the hand of the operator. The roller carrier section 74 comprises an upper section 80 which, for best results, is made integral with the handle 74, and a lower section 82, which for best results, is also made integral with the handle 74.

Figure 9:
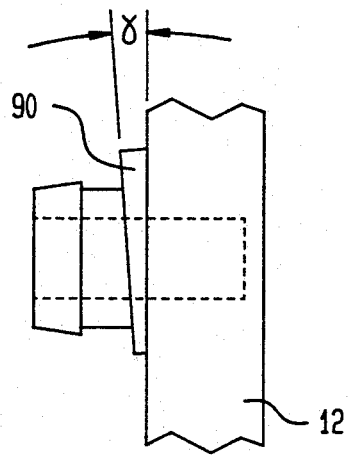
FIG. 9 is a sectional view of one of the roller mounting shafts of the handle of FIG. 6 taken along line DD in FIG. 8.
Figure 10:
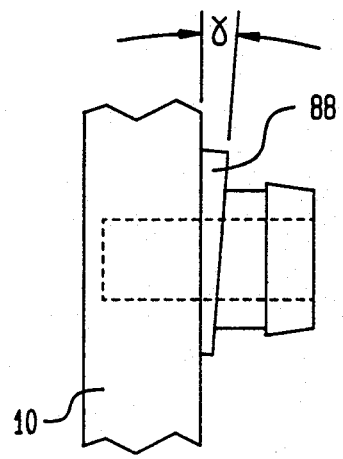
FIG. 10 is a sectional view of one of the roller mounting shafts of the handle of FIG. 6 taken along line EE in FIG. 8.
Figure 11:
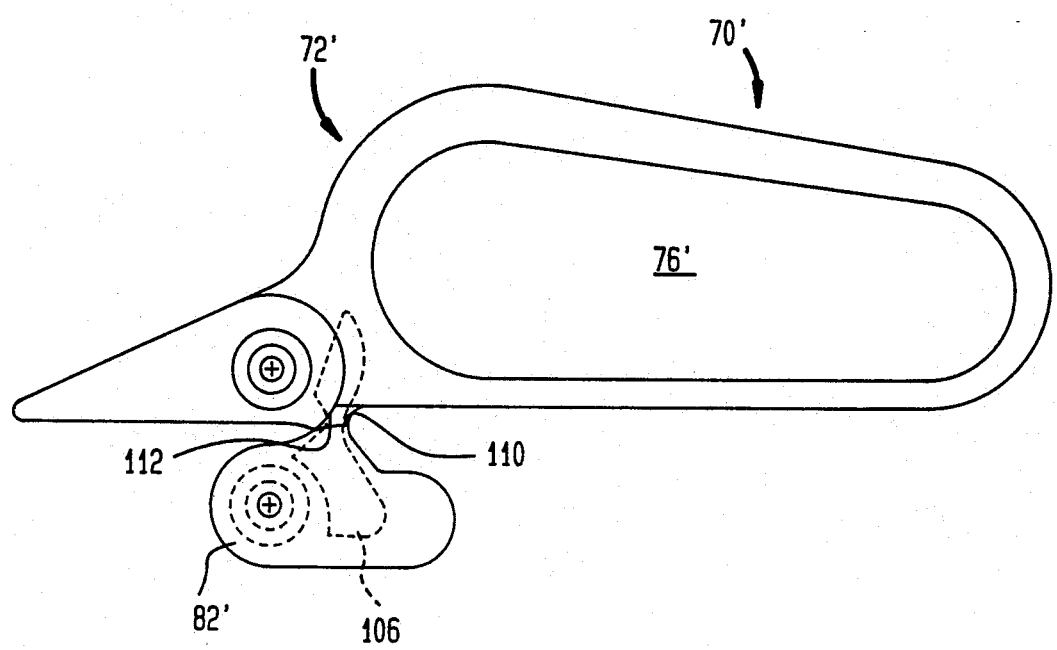
FIG. 11 shows another embodiment of the handle of FIG. 6 with means for improving the curve cutting ability of the cutting implement.

The upper roller 10, shown as a ball bearing 10' having an outer race 11' and an inner race 13', along with a plurality of balls 15 contained conventionally between the inner and outer races, is mounted on a first shaft 84. The lower ball bearing 12' is mounted to a second shaft denoted by the numeral 86. The shafts are best seen in FIGS. 9 and 10, in which angled lands 88 and 90 are provided against which the inner faces of the rollers are pressed. The lands 88 and 90 are angled with respect to the shaft, as shown, and the angle employed herein is approximately one degree for each land, or a two degree included angle (the sum of both angles) tilting the rollers 10 and 12 towards each other. It is these angled lands that provide the toe-in to create the contact point 42 (see FIGS. 4 and 5) when the rollers are mounted on their respective shafts.

Figure 7:
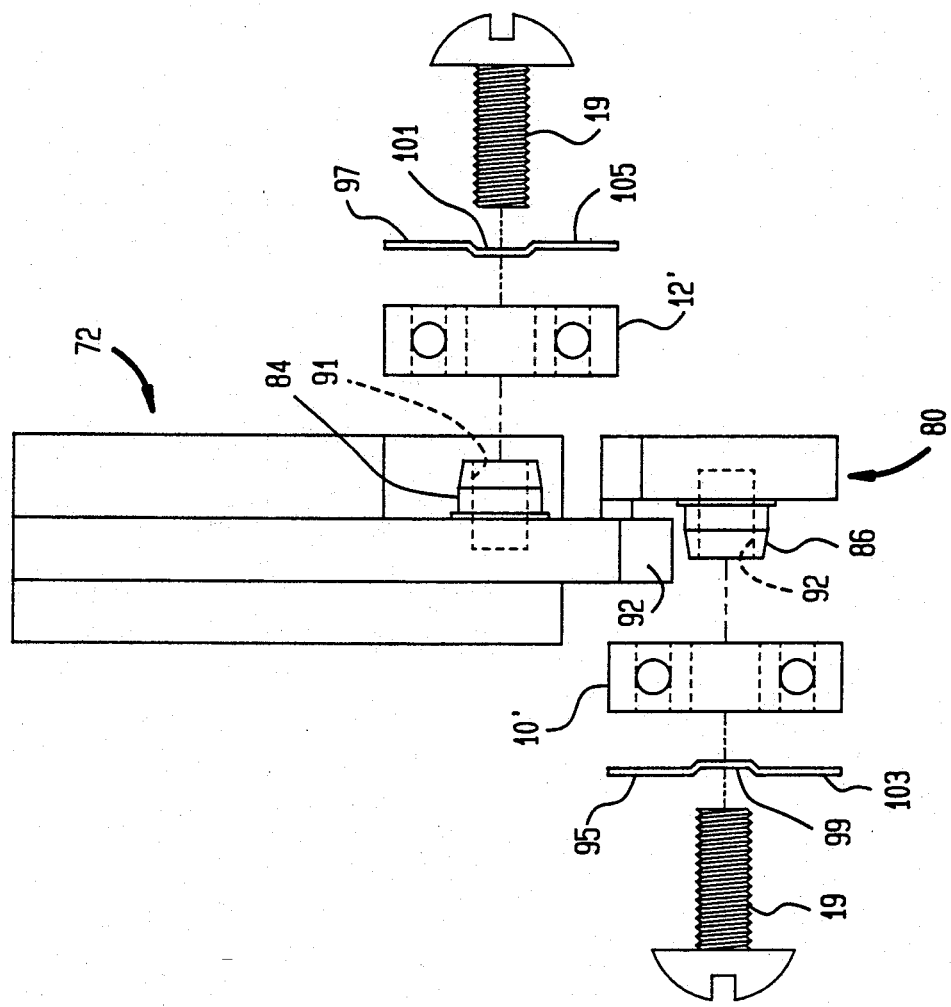
FIG. 7 is an exploded front view of the handle of FIG. 6.

FIG. 6 shows a pair of ball bearings mounted to the shafts, with the mounting means removed for clarity. FIG. 7 is a front view of the cutting implement of FIG. 6 exploded to show the ball bearings and the means for mounting them to their respective shafts. Washers 95 and 97 are provided, each of which has a central depression 99 and 101 respectively, adapted to contact the inner race of the ball bearings when anchored in place by the screws 19. The depressions 99 and 101 are sufficient to insure that the screws 19 will anchor the washer in place and to prevent the disk-like portions 103 and 105 of the washers from contacting the bearing outer races, thus preventing the washers from interfering with the rotation of the outer races. In addition, the diameter of the washers is, for best results, made synonymous with the diameter of the ball bearings. In this manner, the outer edge of each washer tends to protect the sharp edge of its associated ball bearing. The space between the washers and the bearing outer race is sufficiently small to prevent the operator from injected his or her fingers between the washer and the sharp outer edges of the bearings, thus providing an additional degree of safety not available when using scissors, razor blades of knives.

The arrangement of shafts and rollers shown in FIGS. 6 through 10 is best suited to the use of a particular type of roller, namely conventional ball bearings having an inner and outer race and either a ball cage or other type of arrangement, such as conventional needles or rollers (not shown). When mounted on the shaft, the inner race of each bearing is mounted flush against the angled lands 88 and 90, and the outer race is left free to rotate on the internal balls or needles. The mounting system is completed by the use of holding means, such as washers 95 and 97, along with conventional screws 19, which cooperate with the openings 91 and 92 to anchor the inner race of each bearing to its associated angled land, leaving the outer race free to rotate in response to rotational forces applied thereto.

For best results, and for results that are generally repeatable, the design of the cutting implement must account for tolerances in the various parts of the cutting implement as they relate to the position of the rollers with respect to each other, and the expected cutting forces to be applied at the rollers of the cutting implement. Cutting forces tend to displace the rollers both axially and radially, and if not accounted for, will cause the rollers to separate, thus tending to destroy the ability of the implement to continue to cut. Concomitantly, the cutting implement must also be elastic in the sense that any deflection caused by the level of cutting forces for which the implement was designed will not be sufficient to exceed the elastic limits of those parts which are responsible for the alignment between the rollers. In other words, the bearing carriers must be sufficiently strong to remain elastic on the one hand, and also strong enough to retain an acceptable relationship between the rollers as expected cutting forces are applied.

Once the various tolerances of the parts responsible for locating the rollers are specified (including the dimensional tolerances of the rollers, and in particular the axial tolerances between the inner and outer races if a ball or needle type bearing is employed as the roller), and the cutting forces to be expected is set forth, then the various relationships that are needed to insure good results and repeatability in manufacture can be determined. These relationships include the establishment of a cutting point between the two rollers at rest (before cutting forces are applied), the determination of the amount of overlap between the two rollers at rest, the determination of the amount of camber, either positive or negative, that is likely to result both at rest and when the rollers are subjected to cutting forces, the degree of toe-in that is required both at rest and under load, along with a correction for camber that may exist or occur, and the degree of pre-load required to hold the rollers in contact with each other under expected cutting loads. A discussion of these various parameters follows below.

As shown in FIGS. 4 and 5, the degree of overlap is provided in the handle of FIG. 6 by setting the distance between the axes 30 and 32 to yield the degree of desired overlap. To determine the degree of overlap, the equation $$O_v = (1-S_a)(T_h + T_c + (F_a \times R_a))$$

can be employed, in which:

$O_v$ is the degree of overlap;

$T_h$ is the tolerance accumulation in the dimensions locating each roller axis in relation to the other when measured in the transverse plane (see FIG. 1);

$T_c$ is the sum of the tolerances of the dimensions governing the radial size of the rollers at the cutting point 42 (see FIGS. 4 and 5);

$R_a$ is the deflection rate of one roller away from the other due to applied cutting forces when measured along a line connecting the axes 30 and 32, and more particularly, when measured in the transverse plane (see FIG. 1);

$F_a$ is the expected maximum radial force on either roller due to cutting stresses; and $S_a$ is an allowance in $O_v$ to provide a safety factor for minor abuse of the cutting implement to which the rollers are mounted. In other words, $S_a$ represents the minimum overlap that the cutting implement is to have under the conditions for which it is designed.

The foregoing equation can be employed with all rollers, including ball and similar type bearings, to determine the minimum degree of overlap that is required for each type of cutting implement to be built. The degree of overlap is dependent on the strength of the handle or other holder to which the rollers or bearings are to be mounted, the tolerances in the location of the shafts, tolerances in the manufacture of the rollers and in particular their radial dimensions, and the cutting stresses that one expects to generate. This last is a function primarily of the type and thickness of the material to be cut. For most purposes, $S_a$ can be as little as several thousandths of an inch. It is enough that some overlap remains, even though it may be quite small.

The degree of camber that may occur is determined by the following equation:

$$C_a = T_c + (F_c \times R_c) \text{ where}$$

$C_a$ is the camber angle;

$T_c$ is the angular tolerance accumulation in the parallelism of one roller in relation to the other;

$R_c$ is the maximum elastic angular deflection of one roller in relation to the other due to expected cutting forces applied to the rollers as measured in the transverse plane (see FIG. 1); and $F_c$ is the maximum expected torque in the transverse plane (see FIG. 1) on the rollers due to expected applied cutting forces on the rollers.

Camber can be a positive or negative quantity, but in any case, it is an undesirable feature. Its existence can affect the location of the cutting point, and its effects are provided for in the instant invention by accounting for it in the calculation of toe-in.

The degree of toe-in to be employed in connection with establishing a preferred level of toe-in may be determined by the following equation:

$$C_b = T_d + (F_d \times R_d) + Q$$

where $$Q = \text{Arctangent(Tangent } C_a \times \text{Tangent } J)$$

and where:

$T_d$ is the angular tolerance accumulation in the dimensions locating the opposed face of one roller to the other as measured in the cutting plane (see FIG. 1);

$R_d$ is the elastic angular deflection rate of the opposed face of one roller relative to the opposed face of the other roller, as measured in the cutting plane (see FIG. 1);

$F_d$ is the torque acting on the rollers as measured in the cutting plane (see FIG. 1);

$C_a$ is the amount of camber as calculated using the formula provided above;

$Q$ is the additional angular amount to be added to the toe-in angle to correct for the use of camber; and $J$ is the angle formed by the radial line on the opposed face of one of the cutters, anchored at the cutting point (see FIGS. 4 and 5) and terminating at the center of the opposed face of the other roller (its axis).

Toe-in is needed to insure that the contact point 42, as shown in FIGS. 4 and 5, is formed. In particular, the use of toe-in is directed to counteracting the effect of torque on the rollers about their axes that tends to angularly deflect the rollers. If this occurs, the rollers can lose contact with each other at the cutting point, or the cutting point can shift, thus halting further cutting action. The degree of toe-in for a specific application can be determined through the use of the foregoing formula.

Finally, the opposed faces of the rollers should be brought together with sufficient force to pre-load the rollers to avoid separation of the rollers in the axial direction during the application of cutting forces. The term pre-load, as used herein, is defined to mean the distance that the contact point of one roller would pass the contact point on the other (in the axial direction) if the rollers were not restrained by each other in the axial direction. Pre-load is typically manifested in the cutting implement as an elastic deformation of the roller mounting means in the roller axial direction, and it provides the force of contact between the rollers. The degree of pre-load force can be expressed in the following equation:

$$P_a(\text{inches}) = T_a + (F_b \times R_b)$$

where $T_a$ is the tolerance accumulation in dimensions locating one roller axially relative to the other;

$F_b$ is the expected maximum cutting force on the rollers as measured in the axial direction; and $R_b$ is the elastic deflection rate in the axial direction, with reference to the rollers, due to cutting forces.

The unit of measurement for pre-load is in inches rather than pounds. The degree of pre-load employed, as calculated by the foregoing equation, tends to insure that the rollers will not separate in the axial direction when the rollers are subjected to shear cutting forces where the degree of pre-loading is sufficient. When using bearings, particularly ball bearings, the use of pre-loading not only tends to insure that the ball bearings will not separate during cutting, but is also employed to remove the axial play between the inner and outer races inherent in the use of ball bearings. The aforesaid axial tolerance is measured, and expressed for purposes of calculation by, the term $T_a$ above.

It should be reasonably clear that the foregoing equations express the relationship between the various elements of a cutting implement that employ a pair of rollers as the cutting means. It should also be clear that the ranges of shear strength inherent in the materials chosen to be cut is a major factor in determining the various dimensional relationships between the rollers and the minimum required stiffness of the means for holding it.

In one form of the handle 70 shown in FIG. 6, the handle may be made of a strong plastic, such as Valox 508, an engineered plastic made by and available from General Electric, which may be molded to the shape of the handle $70_v$. The rollers may be standard ball bearings built to ABEC 1 dimensional tolerances (an industry standard) with the inner race non-rotatably mounted to the shafts 84 and 86. The outer races, of course, remain freely rotatable. The opposed faces of the ball bearings are ground to provide the sharp edges 34 and 36 (see FIG. 1). The unit is designed to withstand about ten pounds of lateral applied force. Under these conditions, the amount of toe-in is preferably about 1.75° in total, the amount of overlap is about 0.016 inches, and the amount of pre-load is about 0.0054 inches. A cutting implement of this type, and with these parameters, can be employed to cut paper and other thin materials, such as plastics, cardboard, and very thin metals, all of which have sufficient lateral stiffness to avoid collapse as the material is moved to and through the bearings to be shear cut. These materials do not generate substantial cutting forces, and a single hand held cutting implement can be designed that will work well to cut materials ranging from paper to thin metals before the pre-load force will alleviate sufficiently to reduce the shear cutting ability of the cutting implement to the point where it will not work.

This embodiment of the instant invention will not generally cut very thin materials with a very low lateral strength, such as tissue paper. When the operator attempts to move tissue paper through the ball bearings, the tissue paper does not possess sufficient lateral strength to overcome the internal bearing friction loads, the use of a pre-load force, friction between the circumferential surfaces of the bearings and the material to be cut, and the friction at the contact point. The lateral strength of the material to be shear cut must be sufficient to overcome the aforesaid forces without collapsing. If this is not the case, the material will not generally be able to provide the force needed to rotate the ball bearings before the lateral forces reach the point at which the material collapses.

Figure 8:
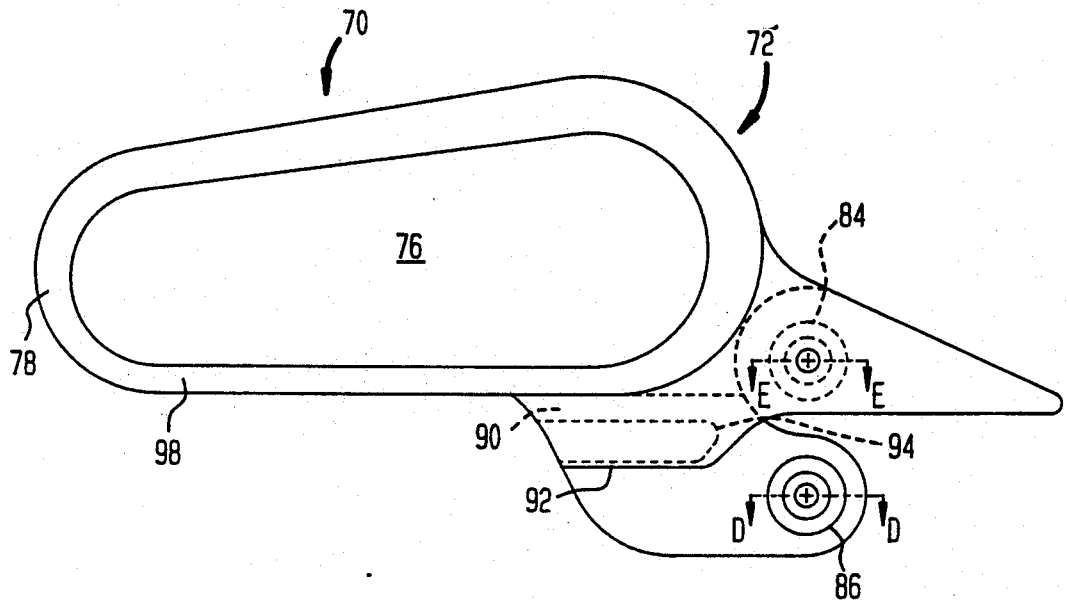
FIG. 8 is a view of the opposite side of the handle of FIG. 6.

The handle 70 is provided with a channel 90 on one side thereof (see FIG. 6), and a material guide 92 on the other side thereof (see FIG. 8). As the material is shear cut by the ball bearings, it is separated, with one section moving to and through the channel 90 and carried past the edge of the handle 70, with the other section moving in a downward direction under the guide 92, its path being determined by the shape of the guide 92. The guide 92 moves the shear cut section of the material that passes thereunder away from the body of the handle 70 (not shown). The channel 90 and the guide 92 move the material out of the area in which shear cutting continues to occur, and tends to assure the smooth separation of the shear cut sections. The handle 70 is also provided with a second channel 94 positioned between the lower bearing carrier 82 and the body of the handle 70. As the material is shear cut, the inner edge of the severed sections (not shown) tends to curl, particularly when cutting paper products such as copy paper, newspaper, magazine stock, and ordinary bond. The second channel is provided to permit the curling edge to clear the handle 70 to assist in obtaining smooth, continuous shear cutting. Of course, the second channel may be dispensed with if desired.

For added safety, the handle 70 is provided with a lower protector 98 that is integral with the handle. As the material that is shear cut moves through the first channel 90, the depth of the channel is sufficient to carry the edge of the cut material under the protector 98, and tends to insure that the material remains under the protector 98 and away from the operator's hand. Guide 92, at the same time, directs the other section of shear cut material downwardly and away from the operator's hand. In this manner, the cutting implement of the instant invention can be made relatively safe, as the material, particularly paper, can cause painful paper cuts without these safeguards.

The handle 70 is rather substantial, and the flow path of the material after it leaves the bearings is somewhat constrained. This tends to reduce the ability to use the cutting implement to cut in circles or to follow curved lines. The ability to shear cut material following a curve or in a circle can be improved by substantially shortening the channel 90, as shown at 110 in FIG. 13. When using the cutting implement shown in FIG. 6 to cut circles, or to follow a curved line, it is to be remembered that the material, after it is shear cut, follows and remains within the channel 90 for a considerable distance before exiting the aforesaid channel. When the operator attempts to rotate the device so that it contacts the material that is in and moving through the channel 90, in order to follow a curved path, the material remaining in the channel acts as a brake, preventing easy rotational movement of the cutting implement to follow the intended curved path. Shortening the channel tends to reduce the braking action exhibited by the channel, and tends to increase the curve following ability of the cutting implement.

When the channel is shortened, the connection 112 between the lower carrier 82 and the body of the handle 72' is also shortened in comparison to the length of the connection between the carrier 82 shown and the handle shown in FIG. 6. The shortening of this connection tends to reduce the stiffness of the cutting implement. To increase the stiffness of the cutting implement, a metal or other stiffening plate 106 is provided which rigidly connects the handle 70' to the lower carrier 82'.

Figure 12:
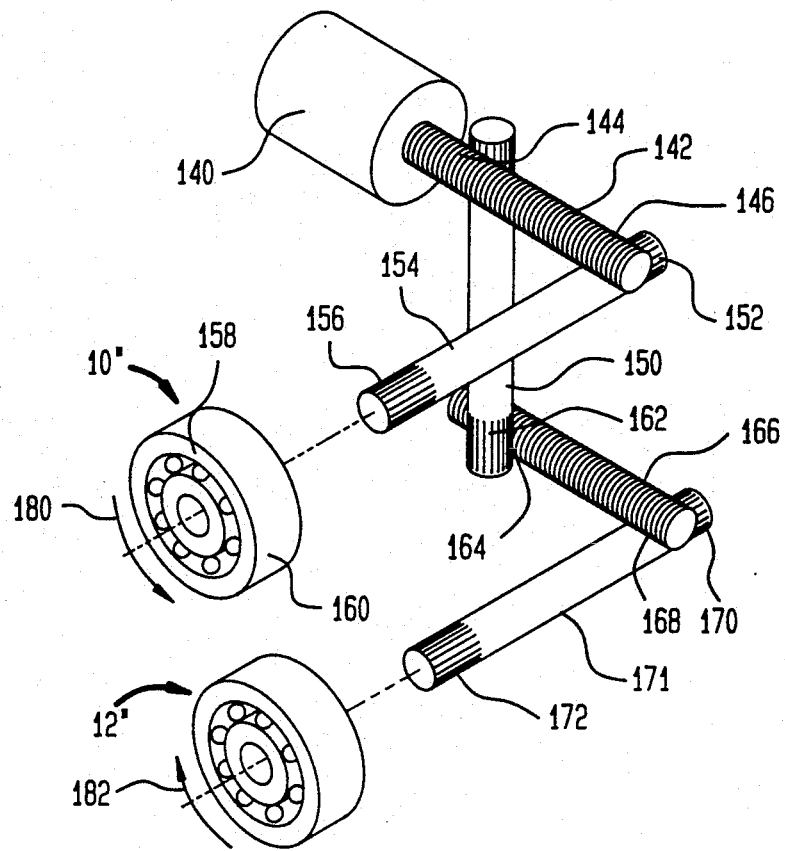
FIG. 12 is an exploded schematic view of the rollers of the instant invention in a hand held instrument to which electrical power is applied to operate the rollers.

Referring now to FIG. 12, a conventional electric motor denoted by the numeral 140 is shown having a rotatable output shaft 142. The rotatable output shaft 142 is provided with a first and second worm gear teeth 144 and 146 respectively. Worm gear teeth 144 are adapted to drive cooperating worm gear teeth 148 (see FIG. 13) on a first power transfer shaft 150. Worm gear teeth 146 on output shaft 142 cooperates with worm gear teeth 152 on second power transfer shaft 154, which in turn is provided with worm gear teeth 156 adapted to cooperate with worm gear teeth 158 cut into the inner portion of ball bearing outer race 160 of ball bearing 10". The first power transfer shaft 150 is provided with additional worm gear teeth 162 adapted to cooperate with associated worm gear teeth 164 provided on a third power transfer shaft 166, which in turn has additional worm gear teeth 168. Worm gear teeth 168 cooperates with worm gear teeth 170 provided on a fourth power transfer shaft 171, which in turn is provided with worm gear teeth 172 adapted to mesh with worm gear teeth (not shown) cut into the inner portion of ball bearing outer race 174 of ball bearing 12". The various worm gear teeth must be made in both left and right handed configurations so that the ball bearings rotate, upon application of power, in the directions denoted by arrows 180 and 182 respectively. Rotating the ball bearings in the indicated directions will pull the material to be cut into the cutting region and through the ball bearings.

Figure 13:
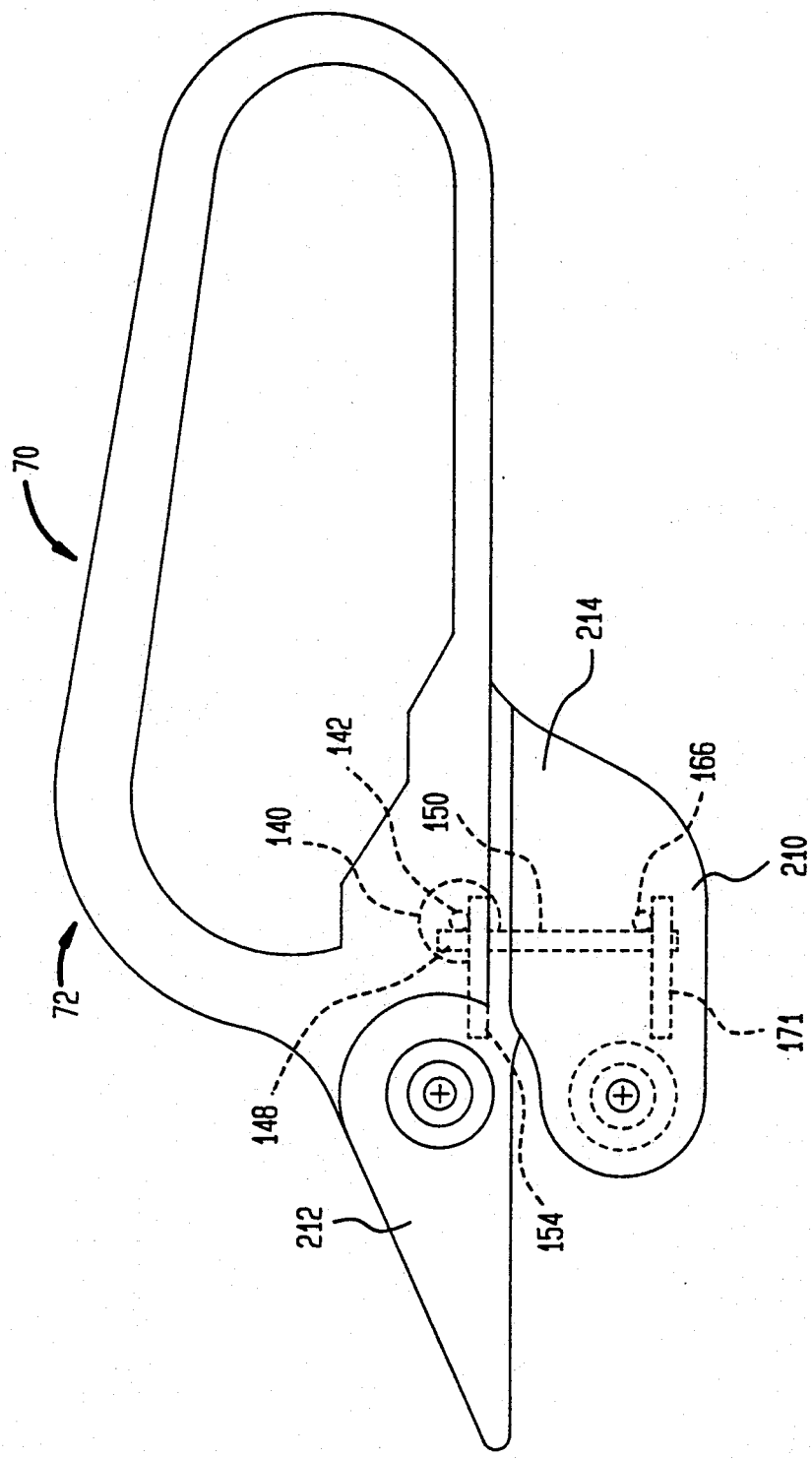
FIG. 13 is a side view of the cutting implement in which the power applying device of FIG. 12 is shown mounted to the device.

The various shafts and the electric motor are shown encased in a cutting implement in FIG. 13, where like numerals refer to like parts. As shown in FIG. 13, the lower ball bearing carrier section 210 is rigidly connected to the upper ball bearing carrier 212. For best results, the upper and lower bearing carriers are integral with each other and with the handle 70, thus providing maximum stiffness for the entire cutting implement. Power shaft 150 traverses the distance equal to its length entirely on the side of the upper bearing carrier, and terminates at the point at which the lower bearing carrier is connected to the upper bearing carrier. this connection region is denoted by the numeral 214. Shaft 166 is located in connection region 214 and terminates in the lower bearing carrier 210 Shaft 154 is entirely located in the upper bearing carrier, while shaft 171 is entirely located in the lower bearing carrier. Bushing means may be provided for mounting each shaft for rotation, although simply provided a cylindrical opening for the shafts in the manner indicated in the drawing may be sufficient for the purpose. FIG. 13 does not show the ball bearings for clarity in presenting the preferred arrangement of the shafts in the cutting implement. However, the ball bearings are shown in exploded view in FIG. 12.

It is intended to cover all such embodiments of the invention that fall with the spirit and scope of the invention as defined in the claims appended hereto.

We claim:

1. A shear cutting implement having a handle, an upper roller carrier and a lower roller carrier, means for substantially rigidly connecting the upper and lower roller carriers to each other, said upper and lower roller carriers also being substantially rigidly connected to said handle, a first roller mounting shaft located on said upper carrier and a second roller mounting shaft located on said lower roller carrier; a first cylindrical roller rotatably mounted on said first roller mounting shaft and a second cylindrical roller rotatably mounted on said second roller mounting shaft, the axes of said first and second roller mounting shafts being offset from each other along a longitudinal plane so as to create a small amount of overlap between opposed facing sides of the first and second cylindrical rollers, the cylindrical surfaces of said roller being parallel to each other and adapted to contact the surface of a material as it is cut; means for causing the opposed facing sides of said first and second rollers to contact each other at a contact point; and passage means for allowing material that has been cut to pass unobstructedly after the material exits the said rollers.

2. The cutting implement according to claim 1 wherein the upper and lower carriers are integral with each other.

3. The cutting implement according to claim 2 wherein the upper and lower carriers are integral with the handle.

4. The shear cutting implement according to claim 1 in which the rotatable rollers are bearings each of which has an inner and outer race, and wherein the inner race of each bearing is mounted non-rotatably to its respective roller mounting shaft and in which the outer race of each bearing is free to rotate; and means between the inner and outer race of each bearing to permit rotation of the outer race of each bearing about its inner race.

5. The shear cutting implement according to claim 4 in which said bearings are ball bearings and in which the means between the inner and outer races of said ball bearings is a plurality of rotatable balls.

6. The cutting implement according to claim 1 in which the means for causing the first and second roller to contact each other at a cutting point comprises an angled land on each of said roller mounting shafts.

7. The cutting implement according to claim 6 in which the included angle formed by the lands is not more than about five degrees.

8. The cutting implement according to claim 7 in which the said included angle is less than about two degrees.

9. The cutting implement according to claim 1, in which the passage means comprises a first passage adjacent the lower roller that extends the length of the means for connecting the lower roller carrier to the handle for allowing a first section of material after it has been cut to freely exit the lower carrier and the handle substantially without interference; second passage means located on the upper roller carrier for allowing a second section of the material after it has been cut to freely exit the upper carrier and the handle substantially without interference.

10. The cutting implement according to claim 9 further comprising a third passage means located in the upper roller carrier for permitting substantially free passage of cut material where the edge of the cut material tends to curl.

11. The cutting implement according to claim 9 wherein the first passage means is substantially straight.

12. The cutting implement according to claim 9 wherein the second passage means comprises an edge at the lower portion of the lower roller carrier for directing the material passing by the lower roller carrier after it has been cut downwardly and away from the handle.

13. The cutting implement according to claim 9 in which the first passage means is short and the connecting the lower and upper roller carriers is shorter than is required to assure the retention of dimensional relationships between the rollers under expected cutting loads to permit the cutting implement to cut in a curved path, and means for stiffening the connection between the upper and lower roller carriers to assure the retention of said dimensional relationships under load.

14. The cutting implement according to claim 1 in which the amount of overlap is selected in accordance with the equation $$O_v = (1 - S_a)(T_h + T_c + (F_a \times R_a))$$

which $O_v$ is the degree of overlap; $T_h$ is the tolerance accumulation in the dimensions locating each bearing axis relative to the other; $T_c$ is the sum of the tolerances of the dimensions governing the radial size of the rollers at the cutting point; $F_a$ is the expected maximum radial force on the rollers; $R_a$ is the deflection rate of one roller away from the other due to expected cutting forces when measured along a line connecting the axes of the two rollers, and $S_a$ is an allowance in $O_v$ to provide a safety factor and to represent the minimum acceptable degree of overlap that the cutting implement should exhibit under load.

15. The cutting implement according to claim 14 in which the means for causing the first and second rollers to contact each other to form a contact point comprises and angled land on each said roller mounting shaft and wherein the angle is determined by $$C_{bk}T_d + (F_d \times R_d) + Q$$

in which $C_b$ is the angle of the land; $T_d$ is the angular tolerance accumulation in the dimensions locating the opposed faces of the rollers in the cutting plane; $F_d$ is the expected torque acting on the rollers in the cutting plane; $R_d$ is the elastic angular deflection rate of the opposed rollers with respect to each other; and $$Q = \text{Arctangent}(\text{Tangent } C_a \times \text{Tangent } J)$$

where Q is the additional angular amount to be added to the angle to correct for camber; and J is the angle formed by the radial line of the rollers, anchored at the cutting point, and terminating at the center of the cutting face of each roller, and where $$C_a = T_c + (F_c \times R_c) \text{ where}$$

$C_a$ is the camber angle; $T_c$ is the angular tolerance accumulation in the parallelism of one roller with respect to the other; $F_c$ is the maximum expected torque applied to the rollers in the transverse plane; and $R_c$ is the maximum expected elastic angular deflection of one roller in relation to the other due to expected applied cutting forces as measure in the transverse plane.

16. The cutting implement according to claim 15 further comprising means for re-loading the rollers in which the amount of pre-load is determined by $$P_a(\text{inches}) = T_a + (F_b \times R_b)$$

where $P_a$(inches) is the amount of pre-load to be applied to the rollers; $T_a$ is the tolerance accumulation in dimensions locating one roller axially relative to the other; $F_b$ is the expected maximum applied cutting force on the rollers as measured in the axial direction; and $R_b$ is the elastic deflection rate in the roller axial direction due to expected applied cutting forces.

17. The cutting implement of claim 1 further comprising motor means and means for transferring power from the said motor means to at least one roller.

18. The cutting implement according to claim 17 wherein the means for transferring power from the motor means to at least one roller comprises a plurality of shafts, each of which is provided with cooperating worm gear teeth for transferring power from one said shaft to another, and teeth means on said roller cooperating with the worm gear teeth means on one of said shafts to cause said roller to rotate.

19. The cutting implement according to claim 18 in which the roller is a ball bearing having an outer race and an inner race, and in which the teeth means are located on the outer race of said roller.

20. The cutting implement according to claim 17 further comprising means for varying the output speed of said motor means.

21. The cutting implement according to claim 20 in which said means for varying the output speed of said motor comprises a rheostat.

* * * * *